United States Patent [19]
Gouge et al.

[11] Patent Number: 5,224,175
[45] Date of Patent: Jun. 29, 1993

[54] METHOD FOR ANALYZING A BODY TISSUE ULTRASOUND IMAGE

[75] Inventors: James O. Gouge, Snellville, Ga.; Thomas Gettys, Lafayette, Colo.

[73] Assignee: GDP Technologies, Inc., Golden, Colo.

[21] Appl. No.: 519,223

[22] Filed: May 7, 1990

Related U.S. Application Data

[63] Continuation-in-part of Ser. No. 129,274, Dec. 7, 1987, Pat. No. 5,040,225.

[51] Int. Cl.$^5$ .......................... G06K 9/00; H04N 5/31
[52] U.S. Cl. .......................... 382/6; 382/22; 382/28; 358/112
[58] Field of Search ............ 128/660.04, 661.02, 128/662.02, 916; 382/6, 22, 28, 39; 358/112

[56] References Cited

U.S. PATENT DOCUMENTS 4,156,231  5/1979  Edamatsu et al. ......... 340/146.3 AE
5,099,521  3/1992  Kosaka ......................... 382/6

FOREIGN PATENT DOCUMENTS 0232131  1/1986  German Democratic Rep. ... 382/22

OTHER PUBLICATIONS

Spiesberger, "Mammogram Inspection by Computer", *IEEE Transactions on Biomedical Engineering*, vol. BME-26, No. 4, Apr. 1979, pp. 213-219.

Primary Examiner—Jose L. Couso
Assistant Examiner—Andrew W. Johns
Attorney, Agent, or Firm—Beaton & Swanson

[57] ABSTRACT

A method and device for interpreting and processing medical ultrasound and other video images. The mix of reflection coefficients in pixel windows is measured by determining the range and distribution of pixel gray scale values to establish "echoic texture" characteristics. These characteristics are compared with corresponding characteristics of known tissues. The degree of correlation allows a prediction of tissue characteristics of the examined window.

12 Claims, 1 Drawing Sheet

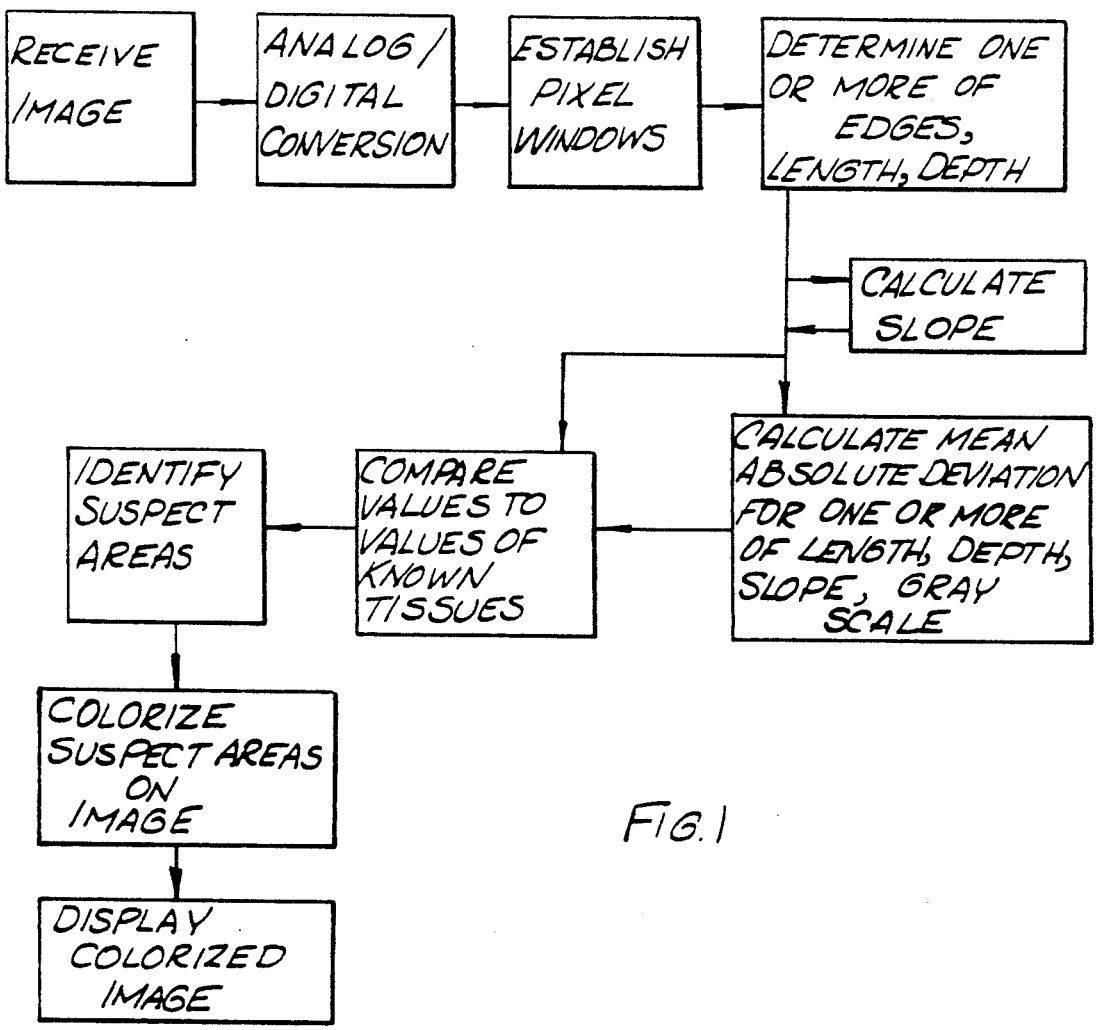

METHOD FOR ANALYZING A BODY TISSUE ULTRASOUND IMAGE

This application is a continuation-in-a-part of co-pending application No. 129,274, filed Dec. 7, 1987, now U.S. Pat. No. 5,040,225.

BACKGROUND OF THE INVENTION

The present invention relates to a process and device for quantifying, analyzing, interpreting, enhancing and representing in computer generated image format, medical ultrasound and other video images.

Images generated by medical ultrasound scanning devices present unique problems for image process and analysis systems. Ultrasonic scanning devices use sound transducers to introduce high frequency sonic waves into the body, either through a hand-held device pressed against the body or through a specially designed transducer inserted into a body cavity such as a rectal cavity. Elements in the body reflect the sonic waves back to the transducer according to the reflection coefficients of the elements. The measured time between emission and detection of the sonic waves is proportional to the depth of the sonic wave reflecting element within the body. A visually projectable image of the reflective elements in a plane of the body can be generated by assigning reflected wave signals a gray scale value in proportion to the reflected wave amplitude, passing the signals through a variable gain amplifier to compensate for attenuation losses as the wave reflecting elements increase in depth, and displaying the results in two dimension. The two dimensional display corresponds to a plane in the body parallel to the direction of wave travel. Bodily elements in the display can be recognized by trained observers. The display can be a moving image by generating and displaying a series of repeated images on a video monitor. This process of generating and interpreting images using ultrasonic transducers and processing means is known as sonography.

The reflective characteristics of wave reflecting elements in the body are referred to in sonography as the "echogenicity" of that area of the body. A highly reflective element would appear bright in the image and is called "hyperechoic," while an element with low reflectivity would appear dark and is called "anechoic." The mixture of hyperechoic and anechoic features in a localized area is termed the "echoic texture" of that area. A uniform set of features with similar reflective coefficients is called "isoechoic." A non-uniform set of features with a broad mix of reflective coefficients, which would appear as a speckled pattern in the image, is called "hypoechoic."

The primary cause of the speckled pattern in the image is that sonic waves do not always follow a direct path from and to the transducer, but instead may be reflected off several curved or angular reflecting surfaces causing small variations in the amplitude of the reflected wave. Since the displayed gray scale value of each "pixel" (picture element) is derived from the amplitude of the reflective wave, this variation produces speckle similar in appearance to snow in a standard television image. Although speckle is not random as is snow in a standard television image, the exact form of speckle in an ultrasound image is virtually impossible to predict because of the extraordinarily complex configuration of body tissues.

Speckle accounts for over 90% of the contents of many ultrasound images, and has been the considered a major cause of the poor quality of those images. Because speckle clouds the image and resembles snow in a television image, it is treated as noise. However, from the explanation above, it can be seen that the characteristics of speckle directly relate to the physical and echoic structure of the tissue being scanned. Thus, existing methods that suppress speckle also suppress valuable information regarding the tissue.

For example, it has been found that the several regions of cancerous tumors of the prostate gland have fairly characteristic echoic textures during the various growth stages. This phenomena is discussed somewhat in a scholarly article entitled "The Use of Transrectal Ultrasound in the Diagnosis, Guided Biopsy, Staging and Screening of Prostate Cancer," published in Volume 7, Number 4 of RadioGraphics, July, 1987. However, prior to the present invention, ultrasonic images were of a quality and resolution too poor for reliable diagnosis based upon echoic textures. Further, no procedure had been devised for the accurate quantification of echoic texture. Instead, diagnosis relied mainly on the experience of the operator.

Apart from methods for analyzing speckle, there are many existing devices and methods aimed at suppressing noise in video images. These devices and methods are primarily for use in standard television images in which noise is manifested as discreet light or dark random spots a few pixels in diameter. Most of the existing methods and devices are not specifically directed toward the unusual problems encountered in ultrasound images. In fact, these methods often suppress speckle information critical to interpreting and analyzing ultrasound images.

BRIEF DESCRIPTION OF THE DRAWINGS

FIG. 1 is a diagrammatical representation of an embodiment of the overall process of the present invention.

FIG. 2 depicts a window of 64 pixels with their gray scale values for a hypothetical example of the echoic texture quantification process of an embodiment of the invention.

SUMMARY OF THE INVENTION

Existing image processing methods typically suppress image speckle in an effort to create a visually pleasing image. In doing so, much valuable information concerning the echoic texture and other tissue information is suppressed. The present invention takes the opposite approach by including a process for analyzing, quantifying and interpreting image speckle. Pixel gray scale values are digitized by horizontal and vertical location in an image. Each pixel is examined in relation to the other pixels in a pixel window of selected size to determine and quantify a variety of characteristics of that pixel window.

The resulting quantified characteristics can be compared with the known corresponding quantified characteristics of known tissues to predict the type of tissue represented by the image. In particular, the quantified characteristics can be used to predict pathological conditions such as tumors. The analysis can be done alone or in combination with tissue samples or alternate forms of image enhancement.

DESCRIPTION OF A PREFERRED EMBODIMENT

The overall process of the present invention is shown diagrammatically in FIG. 1. Manipulation of a video image through automatic digital processing initially requires converting the analog video signals into digital data. This process is well known in the art. Briefly, it requires assigning each pixel an address (i, j) wherein i represents the vertical axis and j represents the horizontal axis, and a gray scale value from, for example, 1 to 256. The resulting converted digital data is stored in machine memory such as a random access memory.

The stored converted digital data can be processed in any of several methods taught herein or in any combination of those methods depending on the symptoms of the patient and the circumstances of the data collection. Those methods and some of the desirable combinations are described below for ultrasonic and other medical images. It should be noted that the precise formulation of the processes for quantifying the echoic texture and enhancing the image may vary somewhat from one ultrasonic device to another, depending on its wavelength and other characteristics. The examples herein assume use with a Bruel & Kjaer Model 1846. Other devices may require their own calibration using known tissue samples.

The image is examined a window of pixels at a time, shown as the hypothetical window of eight pixels by eight pixels depicted in FIG. 2. Several characteristics of echoic texture are derived directly and indirectly from the pixel window and are quantified and compared to the same characteristics in known tissues. This allows a prediction of the nature of the tissue represented in the pixel window.

One of these echoic texture characteristics is the number of image edges in the window. Edges are counted by calculating the gray scale value difference between each horizontal pair of pixels in the window. If the difference exceeds a predetermined adjustable threshold, then the pixels are deemed to represent an image edge. For example, in FIG. 2, the edges are determined by calculating the difference in gray scale value between pixels 8A and 8B, 8B and 8C, 8C and 8D, and so on.

Each calculation that yields a difference of more than, for example, five is deemed on edge. The edges in FIG. 2 are represented by the following pixel pairs, each of which has a difference of more than 5:

8A, 8B
8B, 8C
8E, 8F
8G, 8H
7B, 7C
7C, 7D
7E, 7F
7F, 7G
6D, 6E
6G, 6H
5B, 5C
5D, 5E
5E, 5F
5G, 5H
4F, 4G
3A, 3B
3G, 3H
2A, 2B
2B, 2C
2C, 2D
1B, 1C
1D, 1E

Thus, the number of edges in the pixel window of FIG. 2 is 22. Of course, the pixel pair comparison can be accomplished equally well by comparing vertical pixel pairs such as 8A and 7A, 7A and 6A, and so on, or by comparing diagonal pixel pairs such as 7A and 8B, 6A and 7B, 7B and 8C and so on. The other comparisons can be summed or averaged with the horizontal comparison, can be used in conjunction with the horizontal comparison as a cross check, or can be used in place of the horizontal comparison.

Another characteristic of the echoic texture is the number of pixels between each edge. In FIG. 2, the length between the first edge between pixels 8A and 8B and the second edge between pixels 8B and 8C is one pixel. Of course, the average length will always be the number of pixels in the window divided by the number of edges in the window and is therefore directly proportional to the number of edges and the number of pixels in the window. However, the mean length, as opposed to the average length, may be different depending on the nature of the image, and it has been found that mean lengths may be an indication of tissue characterization independent from number of edges.

Another characteristic is the average gray scale change at each edge. This is calculated by measuring the absolute difference in gray scale values at pixel pair edges and averaging that difference for all the edges in the window. This is referred to as the average depth.

Still another characteristic is a measurement of the average abruptness of the edges. This is referred to as the slope. The slope of each edge is determined by dividing the length between that edge and the prior or successive edge by the depth of that edge. An average slope can be determined by calculating the slope associated with each edge in the window, summing all such slopes, and dividing by the number of edges.

The discussion above teaches the use of numbers of edges, average length between edges, average depth of edges and average edge slope for characterizing echoic texture. It has also been found that the mean absolute deviations of these characteristics are a valuable independent characteristic. The mean absolute deviation is the average absolute difference between the value of a characteristic of each edge in a window and the average of that characteristic in the entire window. Thus, the first step in computing the mean absolute deviation of length between edges is to determine the average length between edges. The absolute difference between the average length between edges in the window and the actual length between edges for each edge is then determined. The average of that absolute difference for all edges in the window is the mean average deviation of length between edges.

The mean average deviation of depth of edges is determined in a similar way. First, the average depth of edges is determined for the window as described above. Then, the absolute difference between the average depth of edges in the window and the actual depth of the edge is determined for each edge. The average of that absolute difference is the mean absolute deviation of depth of edges.

The mean absolute deviation of edge slope is determined in a similar way. The average edge slope is determined for the window as described above. Then, the absolute difference between the average edge slope in the window and the actual edge slope of an edge is determined for each edge in the window. The average of that absolute difference is the mean absolute deviation of slope of edges.

Another characteristic is based on gray scale. It has been found that simply measuring the average gray scale is of little use, because average gray scale merely measures arbitrary brightness. However, the mean absolute deviation of gray scale can be a useful characteristic. This is calculated by determining the average gray scale of all pixels in the window or of all selected pixels such as those associated with an edge, and then calculating the mean absolute deviation for those pixels in accordance with the mean absolute deviation principles described above.

The method described above uses pixel windows of 8 by 8 pixels for quantifying the gray scale range, and thus the echoic texture, within the window. The system can also be readily adjusted to increase or decrease the size of the pixel window. At one extreme, a very large window would produce meaningless results because such a window would normally have a very broad range of gray scale values indicating many different features in the image. At the other extreme, a window of 2 by 2 would also be difficult to interpret since there is little opportunity for such a small window to show a representative gray scale range. The best approach is a window between these extremes with a size that may be adjusted by the operator depending on the size of the features in the image, the image enlargement and the type of elements being sought.

After some or all of the echoic texture characteristics described above are quantified for a given window, they can be compared with the known values of known tissues. The known values of known tissues are determined through empirical pathological studies of the tissues. If the images being examined represent the prostate gland, for example, images of many other prostate glands which have been biopsied or removed are readily available. By quantifying the echoic texture characteristics described above for the images whose pathology is known, and comparing those quantities for the image in question, a highly confident prediction can be made whether the image in question represents healthy tissue or cancerous or other diseased tissue.

The comparisons can be made several ways. All or some combination of the echoic texture characteristics that were calculated can be averaged, perhaps with different weight assigned to each. Alternatively, the mean can be determined, or some other statistical measure such as the root mean square can be determined. That value can be compared with a value similarly calculated for the known images. Alternatively, each echoic texture characteristic can be compared to the same characteristic for the known image. If more than a predetermined number of such comparisons indicate abnormalities, then the tissue in that window is deemed suspect and may be chosen for biopsy, removal or further examination.

The process of determining the echoic texture of a pixel window is repeated throughout the image or throughout the selected area of the image being processed under this procedure. Typically, the process is applied successively to adjacent pixel windows throughout the image. Alternatively, the analyzed area can be operator limited to a selected portion of the image.

It is also possible to overlap the pixel windows. Rather than the next pixel window being immediately adjacent to the last-processed pixel window, the next pixel window could be shifted only one pixel in a given direction. In the case of 8 by 8 pixel windows, this would result in re-processing seven of the rows or columns of the last pixel window, but the re-processing would be with respect to a slightly different pixel window. This can assist in de-emphasizing peculiarities in the image that may not represent tissue information.

The correlation between the quantified characteristics of a window in the examined image and images of various known tissues can itself be quantified. The common quantification of cancerous tumor progression is the Gleason Scale of 1 to 5. The degree of correlation between the quantified characteristics of an examined image window and of known cancerous tissues can be expressed as a Gleason Scale number. Similar applications are possible for other tissue types.

The windows with characteristics that have a high correlation to a sought-after tissue, such as cancerous tumors, can be colorized on the video monitor for easy visual identification. The colors may vary depending on the Gleason Scale or some other measured degree of correlation.

The quantification of echoic texture may be used independently or in combination with one more image enhancement processes. Those processes allow a high quality visual examination of the tissue cross section, which can aid in interpreting the echoic texture and can further aid in examining the tissue in the traditional manner.

What is claimed is:

1. A method for analyzing body tissue, comprising:
   (a) obtaining an ultrasound image including a plurality of discrete image pixels;
   (b) establishing at least one pixel window within said image;
   (c) quantifying in said pixel window at least one of the characteristics of: number of edges, average length between edges, average depth of edges, average slop of edges, mean absolute deviation of length between edges, mean absolute deviation of depth of edges, mean absolute deviation of slope of edges, and mean absolute deviation of gray scale values;
   (d) comparing said quantified characteristics in said pixel window to the same characteristics in images of known tissue in order to predict the type of tissues shown in said window.

2. The method of claim 1, wherein said method is used to identify abnormal tissues.

3. The method of claim 2, further comprising displaying said image with the pixel windows identified as containing abnormal body tissues distinguished from the pixel windows not identified as containing abnormal body tissues.

4. The method of claim 3, wherein said distinguishing is by colorizing said pixel windows containing abnormal body tissues.

5. The method of claim 1, further comprising quantifying the correlation between said quantified characteristics in said pixel window and the same characteristics in images of known tissue.

6. The method of claim 5, wherein said quantification of said correlation between said quantified characteristics in said pixel window and the same characteristics in images of known tissue, is by calculating the absolute difference in said quantified characteristics in said pixel window and the same characteristics in images of known tissue.

7. The method of claim 6, further comprising assigning a tissue type number to said pixel window which corresponds to said absolute difference.

8. The method of claim 7, wherein said known tissue is tumorous, and said tissue type number is a Gleason Scale number.

9. The method of claim 5, further comprising displaying said image, with the pixel windows identified as containing preselected types of body tissues colorized with a color corresponding to said correlation.

10. The method of claim 5, wherein more than one of said characteristics is quantified and said quantifying of said correlation is by averaging together more than one of said quantified characteristics and comparing said average to the same characteristics averaged together for images of known tissues.

11. The method of claim 5, further comprising weighing the quantified correlation of characteristics which indicate preselected types of tissues against the quantified correlation of characteristics that do not indicate preselected types of tissues by a majority voting of more than one characteristics indicating preselected types of tissues.

12. The method of claim 5, further comprising repeating the steps of claims 1 and 5 for a plurality of pixel windows within said image.

* * * * *